(12) United States Patent
An et al.

(10) Patent No.: US 7,553,895 B2
(45) Date of Patent: *Jun. 30, 2009

(54) POLYCARBONATE COMPOSITIONS AND ARTICLES FORMED THEREFROM

(75) Inventors: Yuxian An, Xuhui District (CN); Jing Chen, MinHang District (CN); Hua Jiao, Shijiazhuang (CN); Yegang Lin, Pudong New District (CN); Mahari Tjahjadi, Shanghai (CN); XinMin Yang, Shanghai (CN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 257 days.

This patent is subject to a terminal disclaimer.

(21) Appl. No.: 11/427,472

(22) Filed: Jun. 29, 2006

(65) Prior Publication Data

US 2008/0004397 A1    Jan. 3, 2008

(51) Int. Cl.
C08L 51/00 (2006.01)
C08K 5/42 (2006.01)

(52) U.S. Cl. .................. 524/162; 524/170; 525/64; 525/67

(58) Field of Classification Search .......... 524/170; 525/64

See application file for complete search history.

(56) References Cited

U.S. PATENT DOCUMENTS

| | | | |
|---|---|---|---|
| 3,832,419 A * | 8/1974 | Merritt, Jr. .......... 528/21 |
| 4,756,701 A | 7/1988 | Danko et al. |
| 4,788,252 A * | 11/1988 | de Boer et al. ........ 525/67 |
| 5,025,055 A * | 6/1991 | Hamersma et al. ........ 524/269 |
| 5,380,795 A | 1/1995 | Gosens et al. |
| 5,488,086 A | 1/1996 | Umeda et al. |
| 6,063,844 A | 5/2000 | Barren et al. |
| 6,657,018 B1 * | 12/2003 | Hoover .......... 525/464 |
| 6,914,090 B2 | 7/2005 | Seidel et al. |
| 2003/0105226 A1 | 6/2003 | Cella et al. |
| 2004/0011999 A1 * | 1/2004 | Murray .......... 252/500 |
| 2004/0249070 A1 | 12/2004 | Lim et al. |
| 2005/0085580 A1 * | 4/2005 | Marugan et al. ........ 524/431 |
| 2005/0148719 A1 | 7/2005 | An et al. |
| 2005/0182165 A1 * | 8/2005 | Ma et al. ........ 524/115 |
| 2007/0149722 A1 * | 6/2007 | Fujiguchi et al. ........ 525/464 |

FOREIGN PATENT DOCUMENTS

| | | |
|---|---|---|
| EP | 0 692 522 B1 | 9/2002 |
| WO | 2007075764 A2 | 7/2007 |
| WO | 2007075764 A3 | 7/2007 |

OTHER PUBLICATIONS

Lexan EXL.*
GE Plastics Announces the Next Generation of Polycarbonate: Clear Lexan EXL Resin by Business Editors.*
International Search Report for PCT/US2007/068837 International Filing Date May 14, 2007, Mailing Date Oct. 10, 2007 (5 pages).
Written Opinion of the International Searching Authority for PCT/US2007/068837 International Filing Date May 14, 2007, Mailing Date Oct. 10, 2007 (5 pages).

* cited by examiner

*Primary Examiner*—Marc S. Zimmer
*Assistant Examiner*—John Uselding

(57) ABSTRACT

A thermoplastic polycarbonate composition is disclosed, in various embodiments, having enhanced low-temperature ductility, UV resistance and/or fire-retardance characteristics. The composition comprises a polycarbonate, and a combination of an elastomer-modified graft copolymer and a polysiloxane-polycarbonate copolymer. The polycarbonate composition is useful for manufacture of electronic and mechanical parts, among others.

20 Claims, No Drawings

US 7,553,895 B2

POLYCARBONATE COMPOSITIONS AND ARTICLES FORMED THEREFROM

BACKGROUND

This disclosure generally relates, in various exemplary embodiments, to polycarbonate compositions and articles formed from such compositions having enhanced low-temperature ductility, UV resistance and/or fire-retardance characteristics, as well as uses thereof.

With their strength and clarity, polycarbonate (PC) and copolycarbonate resins offer many significant advantages and are utilized for a number of different commercial applications. Polycarbonate materials are playing a vital role today in applications including electronic engineering (E&E) parts, mechanical parts and so on. Unfortunately, the ductility of polycarbonate resins is adversely affected with sharp notches, high strain rate, and low temperature. To overcome this problem, impact modifiers such as methyl methacrylate/butadiene/styrene copolymer (MBS), poly butylarylate (BA), and polysiloxane have been blended with polycarbonate. For example, U.S. Patent Application Publication No. 2004/0249070 to Lim et al. discloses a polycarbonate composition comprising a rubber modified vinyl-grafted copolymer, a phosphorous mixture of a cyclic phosphazene oligomer compound and a phosphoric acid ester as a flame retardant, and a fluorinated polyolefin resin. In the application, examples of the rubber modified vinyl-grafted copolymer include acrylonitrile-butadiene-styrene (ABS) resin and MBS resin.

U.S. Pat. No. 6,914,090 to Seidel et al. discloses an impact-resistant and flameproofed polycarbonate molding composition suitable for making thin-wall housing parts. The composition contains 5 percent to 20 percent by weight of rubber-modified vinyl(co)polymer, 2 percent to 15 percent by weight of at least one low-volatility, halogen-free flameproofing agent, and 0.1 percent to 6 percent by weight of a silicate mineral. The rubber content of the composition is 2 percent to 6 percent by weight based upon the total weight of the composition.

U.S. Pat. No. 6,063,844 to Barren et al. discloses a thermoplastic resin composition comprising an aromatic polycarbonate resin and a rubber modified graft copolymer. The rubber modified graft copolymer comprises a discontinuous elastomeric phase dispersed in a continuous rigid thermoplastic phase, and at least a portion of the rigid thermoplastic phase being chemically grafted to the elastomeric phase.

U.S. Patent Application Publication No. 2003/0105226 to Cella discloses a polysiloxane-modified polycarbonate comprising polysiloxane units and polycarbonate units. The polysiloxane segments comprise 1 to 20 polysiloxane units. Uses of other polysiloxane-modified polycarbonates are described in U.S. Pat. No. 5,380,795 to Gosen, U.S. Pat. No. 4,756,701 to Kress et al., U.S. Pat. No. 6,657,018, U.S. Pat. No. 5,488,086 to Umeda et al., and EP 0 692 522B1 to Nodera, et al., for example.

However, the introduction of rubber or polysiloxane to polycarbonate materials has some disadvantages. For example, neither polybutylarylate nor polysiloxane has the low-temperature impact compensation capability for the polycarbonate matrix. Core-shell type rubbers such as MBS, cause the polycarbonate matrix to exhibit poor thermal stability and weatherability due to the existence of unsaturated double bonds They also produce poor light resistance and unsatisfactory fire-retardance characteristics. As such, formulations with MBS as an impact modifier are not very desirable for high temperature molding and outdoor applications.

There accordingly remains a need in the art for polycarbonate compositions that can readily produce an article with enhanced low-temperature ductility, UV resistance and/or fire-retardance characteristics, among other properties.

SUMMARY

A polycarbonate composition is disclosed, in various embodiments, having improved low-temperature ductility, UV resistance, and/or fire-retardance characteristics. The composition comprises a polycarbonate, and a synergistic combination of an elastomer-modified graft copolymer and a polysiloxane-polycarbonate copolymer. The polycarbonate composition is useful for manufacture of electronic and mechanical parts, among other applications.

A further aspect of the present disclosure provides a composition, such as a thermoplastic composition and/or an article produced therefrom, that has improved low-temperature ductility, UV resistance, and fire-retardance characteristics. The composition comprises (i) 100 parts by weight of polycarbonate; (ii) from about 0.3 parts to about 7.0 parts by weight of an elastomer-modified graft copolymer; and (iii) from about 0.3 parts to about 7.0 parts by weight of a polysiloxane-polycarbonate copolymer.

In another aspect, the present disclosure provides an article manufactured from the noted thermoplastic compositions, such as a molded or extruded electronic or a mechanical part. The article exhibits enhanced low-temperature impact resistance, and durability (UV resistance, etc.) and/or fire retardance.

The above described characteristics and other non-limiting features are exemplified by the following detailed description.

DETAILED DESCRIPTION

Disclosed herein is a polycarbonate composition, which comprises a combination of an elastomer-modified graft copolymer and a polysiloxane-polycarbonate copolymer. The polycarbonate composition exhibits particular desirable properties such as improved low-temperature ductility, UV resistance and/or fire-retardance characteristics, among others.

As used herein, the term "polycarbonate" refers to a polymer comprising the same or different carbonate units, or a copolymer that comprises the same or different carbonate units, as well as one or more units other than carbonate (i.e. copolycarbonate); the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene ring; "aromatic radical" refers to a radical having a valence of at least one comprising at least one aromatic group; examples of aromatic radicals include phenyl, pyridyl, furanyl, thienyl, naphthyl, and the like; "arylene" refers to a benzene ring diradical or to a benzene ring system diradical fused to at least one optionally substituted benzene ring; "acyl" refers to a monovalent hydrocarbon radical joined to a carbonyl carbon atom, wherein the carbonyl carbon further connects to an adjoining group; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; the modifier "about" used in connection with a quantity is inclusive of the stated value and has the meaning dictated by the context (e.g., includes the degree of error associated with measurement of the particular quantity); "optional" or "optionally" means that the subsequently described event or circumstance may or may not occur, and that the description includes instances where the event occurs and instances where it does not; and "direct bond", where part of a structural variable specification, refers to the direct joining of the substituents preceding and succeeding the variable taken as a "direct bond".

Compounds are described herein using standard nomenclature. A dash ("—") that is not between two letters or symbols is used to indicate a point of attachment for a substituent. For example, —CHO is attached through the carbon of the carbonyl (C=O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another.

The composition comprises effective amounts of components to produce enhanced low-temperature ductility, UV resistance and/or fire-retardance characteristics, among others. In one embodiment, the disclosure relates to a polycarbonate composition comprising a polycarbonate, and a synergistic combination of an elastomer-modified graft copolymer and a polysiloxane-polycarbonate copolymer. Articles formulated from such a polycarbonate composition are also included within the scope of the present disclosure.

In a further embodiment, the disclosure provides a thermoplastic composition comprising:
(i) 100 parts by weight of polycarbonate;
(ii) from about 0.3 parts to about 7.0 parts by weight of an elastomer-modified graft copolymer; and
(iii) from about 0.3 parts to about 7.0 parts by weight of a polysiloxane-polycarbonate copolymer.

Although the amount of elastomer-modified graft copolymer in this embodiment is generally from about 0.3 parts to about 7.0 parts by weight, specifically it can be from about 0.4 parts to about 5.0 parts by weight, more specifically it can be from about 0.5 parts to about 4.0 parts by weight, and most specifically it can be from about 0.5 parts to about 3.7 parts by weight.

Although the amount of polysiloxane-polycarbonate copolymer in this embodiment is generally from about 0.3 parts to about 7.0 parts by weight, specifically it can be from about 0.4 parts to about 5.0 parts by weight, more specifically it can be from about 0.5 parts to about 4.0 parts by weight, and most specifically it can be from about 0.5 parts to about 3.7 parts by weight. Furthermore, the amount of siloxane in the entire polycarbonate composition is from about 0.06 weight percent to about 1.4 weight percent, including from about 0.1 weight percent to about 1 weight percent.

The elastomer-modified graft copolymers may comprise (i) an elastomeric (i.e., rubbery) polymer substrate having a Tg less than 10° C., more specifically less than −10° C., or more specifically −40° to −85° C., and (ii) a rigid polymeric substrate grafted to the elastomeric polymer substrate.

The elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 weight percent of a copolymerizable monomer; elastomeric copolymers of $C_{1-8}$ alkyl (meth)acrylate with conjugated diene; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers, Suitable conjugated diene monomers for preparing the elastomer phase are of formula (E-1):

(E-1)

wherein each $R_1$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Vinyl aromatic compounds may be copolymerized with the ethylenically unsaturated nitrile monomer to form a copolymer, wherein the vinylaromatic compounds can include monomers of formula (E-2):

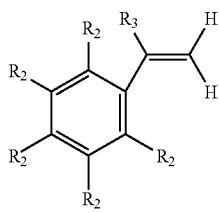

(E-2)

wherein each $R_2$ is independently hydrogen, $C_1$-$C_{12}$ alkyl, $C_3$-$C_{12}$ cycloalkyl, $C_6$-$C_{12}$ aryl, $C_7$-$C_{12}$ arylalkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and $R_3$ is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the generic formula (E-3):

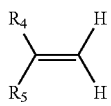

(E-3)

wherein $R_4$ is hydrogen, $C_1$-$C_5$ alkyl, bromo, or chloro, and $R_5$ is $C_1$-$C_{12}$ alkoxycarbonyl, $C_1$-$C_{12}$ aryloxycarbonyl, hydroxy carbonyl, or the like. Examples of monomers of formula (E-3) include, acrylic acid, methyl(meth)acrylate, ethyl(meth)acrylate, n-butyl (meth)acrylate, t-butyl(meth) acrylate, n-propyl(meth)acrylate, isopropyl(meth)acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

(Meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 weight percent of comonomers of formulas (E-1), (E-2), or (E-3). Exemplary comonomers include but are not limited to butadiene, isoprene, styrene, methyl methacrylate, phenyl methacrylate, penethylmethacrylate, N-cyclohexylacrylamide, vinyl methyl ether, and mixtures comprising at least one of the foregoing comonomers. Optionally, up to 5 weight percent of a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl(meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of 0.001 to 25 micrometers, specifically 0.01 to 15 micrometers, or even more specifically 0.1 to 8 micrometers may be used for emulsion based polymerized rubber lattices. A particle size of 0.5 to 10 micrometers, specifically 0.6 to 1.5 micrometers may be used for bulk polymerized rubber substrates. Particle size may be measured by simple light transmittance methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70 weight percent. Also suitable are mixtures of butadiene with styrene and/or $C_{4-6}$ alkyl acrylate rubbers.

The elastomeric phase may provide 5 to 95 weight percent of the total graft copolymer, more specifically 20 to 90 weight percent, and even more specifically 40 to 85 weight percent of the elastomer-modified graft copolymer, the remainder being the rigid graft phase.

The rigid phase of the elastomer-modified graft copolymer may be formed by graft polymerization of a mixture comprising a (meth)acrylate monomer and optionally monovinylaromatic monomer in the presence of one or more elastomeric polymer substrates. The above-described monovinylaromatic monomers of formula (E-2) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (E-3). In one embodiment, $R_4$ is hydrogen or $C_1$-$C_2$ alkyl, and $R_5$ is cyano or $C_1$-$C_{12}$ alkoxycarbonyl. Specific examples of suitable comonomers for use in the rigid phase include, methyl (meth)acrylate, ethyl(meth)acrylate, n-propyl(meth)acrylate, isopropyl (meth)acrylate, and the like, and combinations comprising at least one of the foregoing comonomers.

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise 40 to 95 weight percent elastomer-modified graft copolymer and 5 to 60 weight percent graft (co)polymer, based on the total weight of the impact modifier. In another embodiment, such impact modifiers comprise 50 to 85 weight percent, more specifically 75 to 85 weight percent rubber-modified graft copolymer, together with 15 to 50 weight percent, more specifically 15 to 25 weight percent graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R_d)C(O)OCH_2CH_2R_e$, wherein $R_d$ is hydrogen or a $C_1$-$C_8$ linear or branched alkyl group and $R_e$ is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable, alkenyl-containing organic material may be, for example, a monomer of formula (E-2) or (E-3), e.g., styrene, alpha-methylstyrene, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl) (dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and tetraethoxyorthosilicate may be reacted with a first graft link monomer such as (gamma-methacryloxypropyl)methyldimethoxysilane, to afford silicone rubber having an average particle size from 100 nanometers to 2 micrometers. At least one branched acrylate rubber monomer is then polymerized with the silicone rubber particles, optionally in the presence of a cross linking monomer, such as allylmethacrylate and/or in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to 2 micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

The foregoing types of impact modifiers, including SAN copolymers, can be prepared by an emulsion polymerization process that is free of basic materials such as alkali metal salts of $C_{6-30}$ fatty acids, for example sodium stearate, lithium stearate, sodium oleate, potassium oleate, and the like; alkali metal carbonates, amines such as dodecyl dimethyl amine, dodecyl amine, and the like; and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. In the practice, any of the above-described impact modifiers may be used providing it is free of the alkali metal salts of fatty acids, alkali metal carbonates and other basic materials.

In an embodiment, the elastomer-modified graft copolymer is a methyl methacrylate-butadiene-styrene (MBS) impact modifier. Other examples of elastomer-modified graft copolymers besides MBS include but are not limited to acrylonitrile-butadiene-styrene (ABS), acrylonitrile-styrene-butyl acrylate (ASA), methyl methacrylate-acrylonitrile-butadiene-styrene (MABS), and acrylonitrile-ethylene-propylene-diene-styrene (AES).

In an embodiment, the elastomer-modified graft copolymer comprises a rubbery polymer substrate and a rigid polymer grafted to the rubbery polymer substrate. The rubbery polymer substrate comprises an elastomeric copolymer of $C_{1-8}$ alkyl (meth)acrylate with a conjugated diene; and the rigid polymer comprises a polymer of monovinylaromatic monomers. The elastomer-modified graft copolymer may also be commercially obtained. In an embodiment, a MBS copolymer may be obtained from Rohm & Haas under the trade name of Paraloid EXL2691A.

The polycarbonate composition also comprises a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (S-1):

(S-1)

wherein each occurrence of $R_1$ is the same or different, and is a $C_{1-13}$ monovalent organic radical. For example, $R_1$ may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing $R_1$ groups may be used in the same copolymer.

The value of D in formula (S-1) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (S-2):

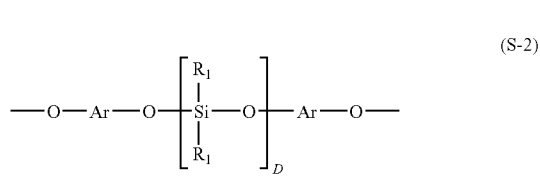

(S-2)

wherein D is as defined above; each $R_1$ may independently be the same or different, and is as defined above; and each Ar may independently be the same or different, and is a substituted or unsubstituted $C_6$-$C_{30}$ arylene radical, wherein the bonds are directly connected to an aromatic moiety. Suitable Ar groups in formula (S-2) may be derived from a $C_6$-$C_{30}$ dihydroxyarylene compound, or any combination of two or more of the dihydroxyarylene compounds. Specific examples of suitable dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (S-2) may be derived from the corresponding dihydroxy compound of formula (S-3):

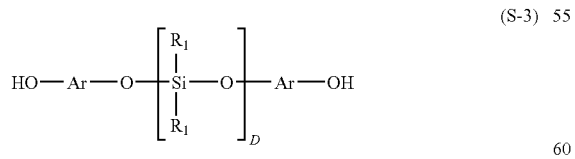

(S-3)

wherein $R_1$, Ar, and D are as described above. Compounds of formula (S-3) may be obtained by the reaction of a dihydroxyarylene compound with, for example, an alpha,omega-bisacetoxypolydiorangonosiloxane under phase transfer conditions.

In another embodiment, polydiorganosiloxane blocks comprise units of formula (S-4):

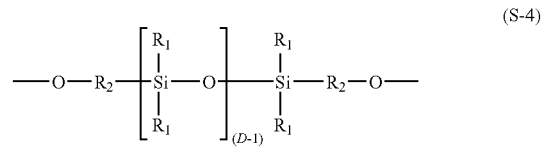

(S-4)

wherein $R_1$ and D are as described above, and each occurrence of $R_2$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (S-5):

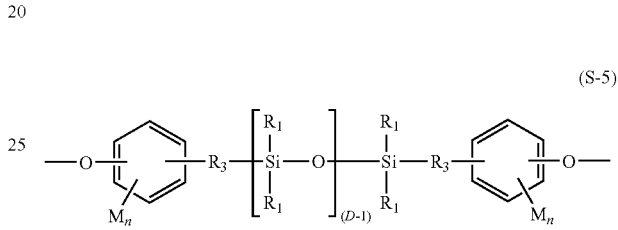

(S-5)

wherein $R_1$ and D are as defined above. Each $R_3$ in formula (S-5) is independently a divalent $C_2$-$C_8$ aliphatic group. Each M in formula (S-5) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R_3$ is a dimethylene, trimethylene or tetramethylene group; and $R_1$ is a $C_{1-8}$ alkyl, haloalkyl such as trifluoropropyl, cyanoalkyl, or aryl such as phenyl, chlorophenyl or tolyl. In another embodiment, $R_1$ is methyl, or a mixture of methyl and trifluoropropyl, or a mixture of methyl and phenyl. In still another embodiment, M is methoxy, n is one, $R_3$ is a divalent $C_1$-$C_3$ aliphatic group, and $R_1$ is methyl.

Units of formula (S-5) may be derived from the corresponding dihydroxy polydiorganosiloxane (S-6):

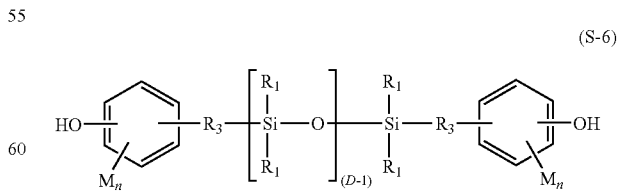

(S-6)

wherein R, D, M, $R_3$, and n are as described above. Such dihydroxy polysiloxanes can be made by effecting a platinum catalyzed addition between a siloxane hydride of formula (S-7):

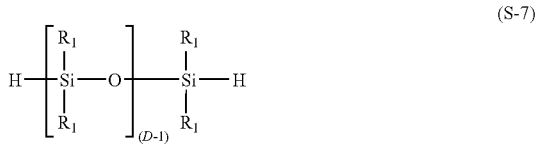
(S-7)

wherein $R_1$ and D are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

In another embodiment, the polysiloxane-polycarbonate copolymer comprises from about 50 to about 99 weight percent of carbonate units and from about 1 to about 50 weight percent siloxane units. Within this range, the polysiloxane-polycarbonate copolymer may comprise from about 70 to about 98 weight percent, specifically from about 75 to about 97 weight percent of carbonate units and from about 2 to about 30 weight percent, specifically from about 3 to about 25 weight percent siloxane units, such as about 20 weight percent siloxane units.

In one specific embodiment, the polysiloxane-polycarbonate copolymer comprises polysiloxane units, and carbonate units derived from bisphenol A. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate copolymer can have a melt volume flow rate, measured at 300° C./1.2 kg, of 1 to 35 cubic centimeters per 10 minutes (cc/10 min), specifically 2 to 30 cc/10 min Mixtures of polysiloxane-polycarbonates of different flow properties may be used to achieve the overall desired flow property.

Examples of suitable polysiloxane-polycarbonate copolymers which can be utilized herein include those described in U.S. Pat. No. 6,657,018, which is fully incorporated herein by reference. Also included are polysiloxane-polycarbonate copolymers having a larger number of polysiloxane units than those specifically mentioned in U.S. Pat. No. 6,657,018.

In one embodiment, the composition comprises a polysiloxane-polycarbonate copolymer, such as Lexan® EXL (General Electric Co.). Lexan® EXL is a polycarbonate-polysiloxane (also referred to as a polysiloxane-polycarbonate copolymer or PC-Si) copolymer with 20 percent siloxane segments by weight. The resin composition comprises a polysiloxane-polycarbonate in an amount effective to maintain at least one mechanical property of the thermoplastic composition prepared therefrom, in the presence of further components. Compositions having polycarbonate-polysiloxane copolymers included have achieved great success in applications like mobile phones and automotive applications.

The polycarbonate of the disclosure can comprise repeating structural carbonate units of the formula (1):

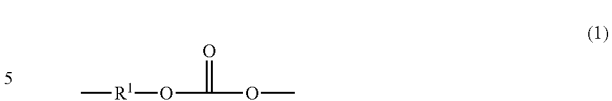
(1)

in which $R^1$ group may be selected from any aromatic radicals, alicyclic radicals, and aliphatic radicals. In an embodiment, at least 60 percent of the $R^1$ groups are aromatic organic radicals.

In a further embodiment, $R^1$ is an aromatic organic radical, for example a radical of the formula (2):

$$-A^1-Y^1-A^2- \qquad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

In another embodiment, the polycarbonate can comprise repeating structural carbonate units of the formula (A-1):

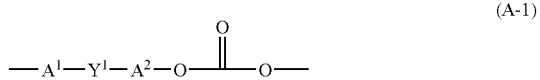
(A-1)

wherein $Y^1$, $A^1$ and $A^2$ are as described above.

In yet another embodiment, polycarbonates may be produced via the interfacial reaction of dihydroxy compounds having the formula HO—$R^1$—OH, which includes dihydroxy compounds of formula (3):

$$HO-A^1-Y^1-A^2-OH \qquad (3)$$

wherein $Y^1$, $A^1$ and $A^2$ are as described above.

In still another embodiment, polycarbonates may be produced via the interfacial reaction of bisphenol compounds of general formula (4):

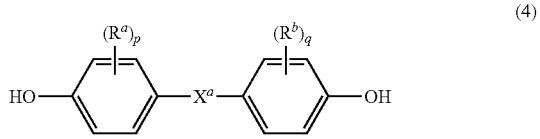
(4)

wherein $R^a$ and $R^b$ each represent a halogen atom or a monovalent hydrocarbon group and may be the same or different; p and q are each independently integers of 0 to 4; and $X^a$ represents one of the groups of formula (5):

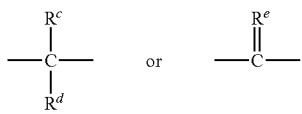

(5)

wherein $R^c$ and $R^d$ each independently represent a hydrogen atom or a monovalent linear or cyclic hydrocarbon group and $R^e$ is a divalent hydrocarbon group.

In yet a further embodiment, polycarbonates may be produced via the interfacial reaction of one or more bisphenol compounds of general formula (B-1):

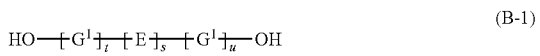

(B-1)

wherein each $G^1$ is independently at each occurrence a $C_6$-$C_{20}$ aromatic radical; E is independently at each occurrence a bond, a $C_3$-$C_{20}$ cycloaliphatic radical, a $C_3$-$C_{20}$ aromatic radical, a $C_1$-$C_{20}$ aliphatic radical, a sulfur-containing linkage, a selenium-containing linkage, a phosphorus-containing linkage, or an oxygen atom; "t" is a number greater than or equal to one; "s" is either zero or one; and "u" is a whole number including zero.

Some illustrative, non-limiting examples of suitable dihydroxy compounds include the following: resorcinol; $C_{1-3}$ alkyl-substituted resorcinols; 4-bromoresorcinol, hydroquinone, 4,4'-dihydroxybiphenyl, 1,6-dihydroxynaphthalene, 2,6-dihydroxynaphthalene, 1,1-bis(4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 1,3-bis[4-hydroxyphenyl-1-(1-methylethylidine)]benzene; 1,4-bis[4-hydroxyphenyl-1-(1-methylethylidine)]benzene; 1,3-bis[3-t-butyl-4-hydroxy-6-methylphenyl-1-(1-methylethylidine)]benzene; 1,4-bis[3-t-butyl-4-hydroxy-6-methylphenyl-1-(1-methylethylidine)]benzene; 4,4'-biphenol; 2,2',6,8-tetramethyl-3,3',5,5'-tetrabromo-4,4'-biphenol; 2,2',6,6'-tetramethyl-3,3',5-tribromo-4,4'-biphenol; 1,1-bis(4-hydroxyphenyl)-2,2,2-trichloroethane; 1,1-bis(4-hydroxyphenyl)-1-cyanoethane; 1,1-bis(4-hydroxyphenyl)dicyanomethane; 1,1-bis(4-hydroxyphenyl)-1-cyano-1-phenylmethane; 2,2-bis(3-methyl-4-hydroxyphenyl)propane; 1,1-bis(4-hydroxyphenyl)norbornane; 3,3-bis(4-hydroxyphenyl)phthalide; 1,2-bis(4-hydroxyphenyl)ethane; 1,3-bis(4-hydroxyphenyl)propenone; bis(4-hydroxyphenyl) sulfide; 4,4'-oxydiphenol; 4,4-bis(4-hydroxyphenyl)pentanoic acid; 4,4-bis(3,5-dimethyl-4-hydroxyphenyl)pentanoic acid; 2,2-bis(4-hydroxyphenyl)acetic acid; 2,4'-dihydroxydiphenylmethane; 2-bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl)cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 4,4'-[1-methyl-4-(1-methylethyl)-1,3-cyclohexanediyl]bisphenol (1,3 BHPM); 4-[1-[3-(4-hydroxyphenyl)-4-methylcyclohexyl]-1-methyl-ethyl]-phenol (2,8 BHPM); 3,8-dihydroxy-5a, 10b-diphenylcoumarano-2',3',2,3-coumarane (DCBP); 2-phenyl-3,3-bis(4-hydroxyphenyl)phthalimidine; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trinmethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4- hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol; 4,4'-bis(3,5-dimethyl)diphenol; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; 1,4-bis(2-(4-hydroxy-3-methylphenyl)-2-propyl)benzene; 2,4'-dihydroxyphenyl sulfone; 4,4'-dihydroxydiphenylsulfone (BPS); bis(4-hydroxyphenyl)methane; 2,6-dihydroxy naphthalene; hydroquinone; 3-(4-hydroxyphenyl)-1,1,3-trimethylindan-5-ol; 1-(4-hydroxyphenyl)-1,3,3-trimethylindan-5-ol; 4,4-dihydroxydiphenyl ether; 4,4-dihydroxy-3,3-dichlorodiphenylether; 4,4-dihydroxy-2,5-dihydroxydiphenyl ether; 4,4-thiodiphenol; 2,2,2',2'-tetrahydro-3,3,3',3'-tetramethyl-1,1'-spirobi[1H-indene]-6,6'-diol; bis(4-hydroxyphenyl) acetonitrile; bis(4-hydroxyphenyl)sulfoxide; bis(4-hydroxyphenyl)sulfone; 9,9-bis(4-hydroxyphenyl)fluorine; 2,7-dihydroxypyrene; 6,6'-dihydroxy-3,3,3',3'-tetramethylspiro(bis)indane ("spirobiindane bisphenol"); 3,3-bis(4-hydroxyphenyl)phthalide; 2,6-dihydroxydibenzo-p-dioxin; 2,6-dihydroxythianthrene; 2,7-dihydroxyphenoxathin; 2,7-dihydroxy-9,10-dimethylphenazine; 3,6-dihydroxydibenzofuran; 3,6-dihydroxydibenzothiophene; 2,7-dihydroxycarbazole, and the like, as well as combinations comprising at least one of the foregoing dihydroxy compounds.

Specific examples of the types of bisphenol compounds represented by formula (4) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), 1,1-bis(4-hydroxyphenyl)-3,3,5-trimethylcyclohexane (BPI), and 1,1-bis(4-hydroxy-3-methylphenyl)cyclohexane (DMBPC). Combinations comprising at least one of the foregoing dihydroxy compounds may also be used.

In one embodiment, the polycarbonate can comprise repeating structural carbonate units of the formula (A-2):

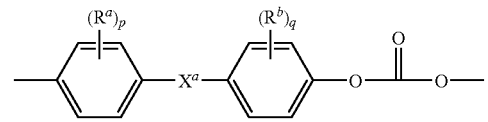

(A-2)

wherein p, q, $R^a$, $R^b$ and $X^a$ are as described above.

In another embodiment, the polycarbonate can comprise repeating structural carbonate units of the formula (A-3), i.e. BPA unit:

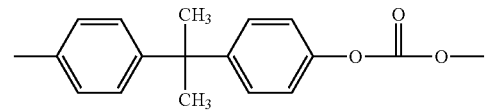

(A-3)

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents may be added at a level of 0.05 to 2.0 weight percent of the polycarbonate. All types of polycarbonate end groups are contemplated as being useful in the polycarbonate, provided that such end groups do not significantly affect desired properties of the polycarbonate product.

The polycarbonates may have a weight average molecular weight (Mw) of from about 1500 to about 100,000, including from about 5000 to about 50,000, and most specifically from about 10,000 to about 30,000, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of thin articles may have an MVR, measured at 300° C./1.2 kg according to ASTM D1238-04, of 0.5 to 80 cubic centimeters per 10 minutes (cc/10 min). In a specific embodiment, a suitable polycarbonate composition has an MVR measured at 300° C./1.2 kg according to ASTM D1238-04, of 0.5 to 50 cc/10 min, and more specifically 0.5 to 30 cc/10 min. Mixtures of polycarbonates of different flow properties may be used to achieve the overall desired flow property.

Polycarbonates of the disclosure may include copolymers comprising carbonate chain units and other optional units. A specific suitable copolymer is a polyester-polycarbonate, also known as a copolyester-polycarbonate and polyester-carbonate. Combinations of polycarbonates and polyester-polycarbonates may also be used. As used herein, a "combination" is inclusive of all mixtures, blends, alloys, reaction products, and the like. In one embodiment, polyester-polycarbonates contain repeating units of formula (6):

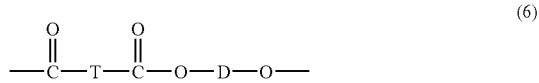

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic orterephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids, Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In a further embodiment, carbonate units of formula (1) may also be derived from aromatic dihydroxy compounds of formula (7), wherein specific carbonate units are resorcinol carbonate units.

Specifically, the polyester unit of a polyester-polycarbonate can be derived from the reaction of a combination of isophthalic and terephthalic diacids (or derivatives thereof) with resorcinol, bisphenol A, or a combination comprising one or more of these, wherein the molar ratio of isophthalate units to terephthalate units is 91:9 to 2:98, specifically 85:15 to 3:97, more specifically 80:20 to 5:95, and still more specifically 70:30 to 10:90. In case the polycarbonate comprises units derived from resorcinol and/or bisphenol A, the molar ratio of resorcinol carbonate units to bisphenol A carbonate units can be 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the ratio of polycarbonate to polyester-polycarbonate in the blend can be, respectively, 1:99 to 99:1, specifically 10:90 to 90:10

The polyester-polycarbonates may have a weight-averaged molecular weight (Mw) of 1,500 to 100,000, specifically 1,700 to 50,000, and more specifically 2,000 to 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 11. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as a capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2- hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

In one embodiment, the polyester-polycarbonates may be prepared by interfacial polymerization. Rather than utilizing a dicarboxylic acid, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$-alkoxy group or a $C_{6-18}$ aryloxy group In one embodiment, an effective amount of a phase transfer catalyst may be 0.1 to 10 weight percent based on the weight of bisphenol in the phosgenation mixture. In another embodiment, an effective amount of phase transfer catalyst may be 0.5 to 2 weight percent based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

In an embodiment, a mixture of two or more polycarbonates may be used in the composition, for example, a mixture of BPA-PC 22K and BPA-PC 30K. BPA-PC 22K is Bisphenol A polycarbonate resin made by an interfacial process with an Mw of 22,000 available from GE Plastics. BPA-PC 30K is Bisphenol A polycarbonate resin made by an interfacial process with an Mw of 30,000 available from GE Plastics.

In addition to the polycarbonates, polyester-polycarbonates, and combinations of these as described above, it is also possible to use combinations of the polycarbonates and polyester-polycarbonates with other thermoplastic polymers, for example combinations of polycarbonates and/or polycarbonate copolymers with polyesters.

Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition.

An example of a useful class of polyester is the poly(alkylene terephthalate)s. Specific examples of poly(alkylene terephthalate)s include, but are not limited to, poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also useful are poly(cyclohexanedimethanol terephthalate)-co-poly(ethylene terephthalate), abbreviated as PETG wherein the polymer comprises greater than or equal to 50 mole percent of poly(ethylene terephthalate), and abbreviated as PCTG, wherein the polymer comprises greater than 50 mole percent of poly(cyclohexanedimethanol terephthalate). The above polyesters can include the analogous aliphatic polyesters such as poly(alkylene cyclohexanedicarboxylate), an example of which is poly(1,4-cyclohexylenedimethylene-1,4-cyclohexanedicarboxylate) (PCCD). Also contemplated are the above polyesters with a minor amount, e.g., from 0.5 to 10 percent by weight, of units derived from an aliphatic diacid and/or an aliphatic polyol to make copolyesters.

As described above, the disclosure provides, in one embodiment, a thermoplastic composition comprising (i) 100 parts by weight of polycarbonate; (ii) from about 0.3 parts to about 7.0 parts by weight of an elastomer-modified graft copolymer; and (iii) from about 0.3 parts to about 7.0 parts by weight of a polysiloxane-polycarbonate copolymer. It is believed that the particular proportions of the elastomer-modified graft copolymer, and the polysiloxane-polycarbonate copolymer produce a synergistic effect and result in a polycarbonate product with significantly improved properties and characteristics.

In a further embodiment, the elastomer-modified graft copolymer comprises MBS, and the polysiloxane-polycarbonate copolymer comprises a polysiloxane-polycarbonate copolymer having about 20 percent siloxane units (such as Lexan® EXL). Polysiloxane-polycarbonate copolymers generally exhibit excellent properties such as low temperature impact resistance, good thermal and light stability, and good processing capability. However, polysiloxane-polycarbonate copolymers are not particularly cost-effective, and compositions comprising the polysiloxane-polycarbonate copolymers do not provide low temperature impact that is as good compositions comprising MBS.

It was surprisingly found that a combination of MBS and polysiloxane-polycarbonate copolymer results in a product with improved properties, such as super low temperature Notched Izod impact resistance, among others. In addition, the composition having the combination of MBS and polysiloxane-polycarbonate copolymer has better flame resistance and weatherability compared to compositions that contain MBS only. Advantageously, the compositions have a combination of low temperature, impact resistance while having only a small amount of rubbers, thereby overcoming the drawback associated with MBS alone, such as poor UV resistance and poor flame retarding capability.

For example, in some embodiments, articles can be formed from the thermoplastic compositions having a Notched Izod Impact resistance at 23° C. of 600 J/m or more, including from about 600 J/m to about 900 µm, such as from about 700 J/m to about 850 J/m. Additionally, the articles exhibit a gloss retention under 1500 kj exposure of about 68 or more, including from about 60 to about 80. Moreover, the articles pass UL94 V0 @ 1.6 mm.

In an embodiment, MBS and polysiloxane-polycarbonate copolymer may be pre-blended with polycarbonate, and then the mixture extruded through twin screws under normal polycarbonate processing conditions.

In another embodiment, the thermoplastic composition comprises (i) 100 parts by weight of polycarbonate; (ii) from about 0.3 parts to about 7.0 parts by weight of an elastomer-modified graft copolymer; (iii) from about 0.3 parts to about 7.0 parts by weight of a polysiloxane-polycarbonate copolymer; and (iv) one or more additives selected from the group consisting of hydrolysis stabilizer, filler/reinforcing agent, visual effect enhancer, antioxidant, heat stabilizer, light stabilizer, ultraviolet light absorber, plasticizer, mold release agent, lubricant, antistatic agent, pigment, dye, flame retardant, processing aid, radiation stabilizer, and anti-drip agent.

In various embodiments, additives ordinarily incorporated in the thermoplastic compositions are selected so as not to adversely affect the desired properties of the thermoplastic composition Mixtures of additives may be used. Such additives may be mixed at a suitable time during the mixing of the components for forming the thermoplastic composition.

The thermoplastic composition may comprise one or more hydrolysis stabilizers for reducing hydrolysis of ester and/or carbonate groups. Typical hydrolysis stabilizers may include carbodiimide-based additives such as aromatic and/or cycloaliphatic monocarbo-diimides substituted in position 2 and 2', such as 2,2',6,6'-tetraisopropyldiphenylcarbodiimide. Polycarbodiimides having a molecular weight of greater than 500 grams per mole are also suitable. Other compounds useful as hydrolysis stabilizers include an epoxy modified acrylic oligomers or polymers, and oligomers based on cycloaliphatic epoxides. Specific examples of suitable epoxy functionalized stabilizers include Cycloaliphatic Epoxide Resin ERL-4221 supplied by Union Carbide Corporation (a subsidiary of Dow Chemical), Danbury, Conn.; and JONCRYL® ADR-4300 and JONCRYL® ADR-4368, available from Johnson Polymer Inc, Sturtevant, Wis. When present, hydrolysis stabilizers can be used in amounts of 0.05 to 1 percent by weight, specifically 0.1 to 0.5 percent by weight, and more specifically 0.12 to 0.3 percent by weight, based on the weight of the component (i) polycarbonate used in the thermoplastic composition.

The thermoplastic composition may comprise a colorant such as a pigment and/or dye additive. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. When present, pigments can be used in amounts of 0.01 to 10 percent by weight, based on the weight of the component (i) polycarbonate used in the thermoplastic composition.

Suitable dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-tbutylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. When present, dyes can be used in amounts of 0.01 to 10 percent by weight, based on the total weight of the component (i) polycarbonate used in the thermoplastic composition.

The thermoplastic composition may include fillers or reinforcing agents. Where used, suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, finite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues papers and felts or the like; or three-dimensional reinforcements such as braids. When present, fillers can be used in amounts of 0 to 90 percent by weight, based on the weight of the component (i) polycarbonate used in the thermoplastic composition.

Visual effect enhancers, sometimes known as visual effects additives or pigments may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited to, Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS # 522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead. When present, visual effect enhancers can be used in amounts of 0.01 to 10 percent by weight, based on the weight of the component (i) polycarbonate used in the thermoplastic composition.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. When present, antioxidants can be used in amounts of 0.0001 to 1 percent by weight, based on the weight of the component (i) polycarbonate used in the thermoplastic composition.

In an embodiment, octadecyl 3,5-di-tert-butyl-4-hydroxyhydrocinnamate (abbreviated as AO-1076) under the trade name of Irganox™ 1076 from Ciba Specialty Chemicals, pentaerythritol betalaurylthiopropionate with chemical abstract service number [29598-76-3] under the trade name of Seenox™ 412S from Argus Chemical Company, and tris (2,4-di-tert-butylphenyl)phosphite (IRGAPHOS™ 168, Ciba-Geigy) were used as the antioxidants, the amounts of which were about 0.3 percent, about 0.2 percent, and about 0.1 percent by weight respectively, based on the weight of the component (i) polycarbonate used in the thermoplastic composition.

In another embodiment, Bis(2,4-dicumylphenyl)pentaerythritol diphosphite under the trade name of DOVER-PHOS® S9228 from Dover Chemical Corporation was used as the antioxidant, the amount of which was about 0.06 percent by weight, based on the weight of the component (i) polycarbonate used in the thermoplastic composition.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. When present, heat stabilizers can be used in amounts of 0.0001 to 1 percent by weight, based on the weight of the component (i) polycarbonate used in the thermoplastic composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octyl phenyl)-benzotriazole and 2-hydroxy-4-n-octoxy benzophenone, or the like, or combinations comprising at least one of the foregoing light stabilizers. When present, light stabilizers can be used in amounts of 0.0001 to 1 percent by weight, based on the weight of the component (i) polycarbonate used in the thermoplastic composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis (4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing UV absorbers. When present, UV absorbers can be used in amounts of 0.0001 to 1 percent by weight, based on the weight of the component (i) polycarbonate used in the thermoplastic composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. When present, such materials can be used in amounts of 0.001 to 1 percent by weight, specifically 0.01 to 0.75 percent by weight, more specifically 0.1 to 0.5 percent by weight, based on the weight of the component (i) polycarbonate used in the thermoplastic composition.

In an embodiment, octadecyl pentaerythritol tetrastearate (PETS), known as Loxiol from Henkel, was used as the mold release agent/lubricant, the amount of which was about 0.28 percent by weight, based on the weight of the component (i) polycarbonate used in the thermoplastic composition. PETS may be injected into an extruder via nozzles.

In an embodiment, PETS was used as the mold release agent/lubricant, the amount of which was about 0.42 percent by weight, based on the weight of the component (i) polycarbonate used in the thermoplastic composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat™ 6321 (Sanyo) or Pebax™ MH1657 (Atofina), Irgastat™ P18 and P22 (Ciba-Geigy). Other polymeric materials that may be used as antistatic agents are inherently conducting polymers such as polyaniline (commercially available as PANIPOL® EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. When present, antistatic agents can be used in amounts of 0.0001 to 5 percent by weight, based on the weight of the component (i) polycarbonate used in the thermoplastic composition.

Suitable flame retardants that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups may be joined together to provide a cyclic group, for example, diphenyl pentaerythritol diphosphate. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas (18), (19), and (20) below:

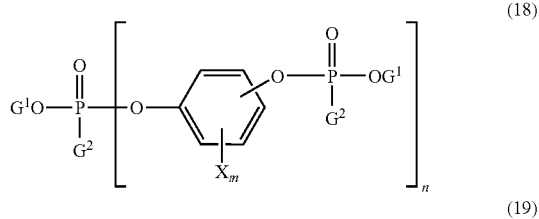

(18)

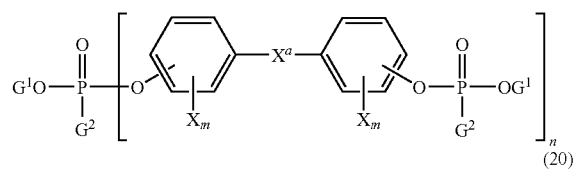

(19)

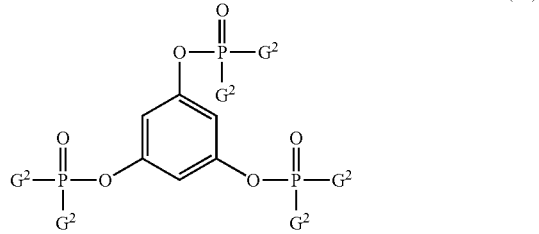

(20)

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms; each X is independently a bromine or chlorine; m is 0 to 4, and n is 1 to 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants can be present in amounts of 0.1 to 10 percent by weight, based on the weight of the component (i) polycarbonate used in the thermoplastic composition.

Halogenated materials may also be used as flame retardants, for example halogenated compounds and resins of formula (21):

(21)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (21) are each independently mono- or polycarbocyclic aromatic groups such as phenylene, biphenylene, terphenylene, naphthylene, or the like.

Y is an organic, inorganic, or organometallic radical, for example: halogen, e.g., chlorine, bromine, iodine, fluorine; ether groups of the general formula OE, wherein E is a monovalent hydrocarbon radical similar to X; monovalent hydrocarbon groups of the type represented by R; or other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and arylalkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-d ichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants can be present in amounts of 0.1 to 10 percent by weight, based on the weight of the component (i) polycarbonate used in the thermoplastic composition.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts can be present in amounts of 0.1 to 5 percent by weight, based on the weight of the component (i) polycarbonate used in the thermoplastic composition.

In an embodiment, potassium diphenylsulfone sulfonate (KSS) from Sloss Corporation was used as the inorganic flame retardant salt, the amount of which was about 3.16 percent by weight, based on the weight of the component (i) polycarbonate used in the thermoplastic composition.

Radiation stabilizers may also be present, specifically gamma-radiation stabilizers. Suitable gamma-radiation stabilizers include diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,2-cyclopentanediol, 1,2-cyclohexanediol, and the like; branched acyclic diols such as 2,3-dimethyl-2,3-butanediol (pinacol), and the like, and polyols, as well as alkoxy-substituted cyclic or acyclic alkanes. Alkenols, with sites of unsaturation, are also a useful class of alcohols, examples of which include 4-methyl-4-penten-2-ol, 3-methyl-pentene-3-ol, 2-methyl-4-penten-2-ol, 2,4-dimethyl-4-pene-2-ol, and 9-decen-1-ol. Another class of suitable alcohols is the tertiary alcohols, which have at least one hydroxy substituted tertiary carbon. Examples of these include 2-methyl-2,4-pentanediol (hexylene glycol), 2-phenyl-2-butanol, 3-hydroxy-3-methyl-2-butanone, 2-phenyl-2-butanol, and the like, and cycloaliphatic tertiary carbons such as 1-hydroxy-1-methyl-cyclohexane. Another class of suitable alcohols is hydroxymethyl aromatics, which have hydroxy substitution on a saturated carbon attached to an unsaturated carbon in an aromatic ring. The hydroxy substituted saturated carbon may be a methylol group (—$CH_2OH$) or it may be a member of a more complex hydrocarbon group such as would be the case with (—$CR^4HOH$) or (—$CR^4_2OH$) wherein $R^4$ is a complex or a simple hydrocarbon. Specific hydroxy methyl aromatics may be benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, and polypropylene glycol. When present, radiation stabilizers are typically used in amounts of 0.001 to 1 weight percent, more specifically 0.01 to 0.5 weight percent, based on the weight of the component (i) polycarbonate used in the thermoplastic composition.

Anti-drip agents may also be used, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion TSAN may provide significant advantages over PTFE, in that TSAN may be more readily dispersed in the composition. A suitable TSAN may comprise, for example, 50 weight percent PTFE and 50 weight percent SAN, based on the total weight of the encapsulated fluoropolymer. The SAN may comprise, for example, 75 weight percent styrene and 25 weight percent acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. When present, antidrip agents can be used in amounts of 0.1 to 5 percent by weight, based on the weight of the component (i) polycarbonate used in the thermoplastic composition.

In an embodiment, PTFE from GE plastics was used as the antidrip agent, the amount of which was about 0.48 percent by weight, based on the weight of the component (i) polycarbonate used in the thermoplastic composition.

Non-limiting examples of processing aids that can be used include Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like. When present, processing aids can be used in amounts of 0.001 to 1 percent by weight, based on the weight of the component (i) polycarbonate used in the thermoplastic composition.

The thermoplastic composition may be manufactured by methods generally available in the art, for example, in one embodiment, in one manner of proceeding, powdered polycarbonate, and any optional additive(s) are first blended, in a HENSCHEL-Mixer® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic article comprises melt combining a polycarbonate, and any optional additive(s), to form a thermoplastic composition. The melt combining can be done by extrusion. In an embodiment, the proportions of polycarbonate, and any optional additive(s) are selected such that the optical properties of the thermoplastic composition are maximized while mechanical performance is at a desirable level.

In a specific embodiment, the extruder is a twin-screw extruder The extruder is typically operated at a temperature of 180 to 385° C., specifically 200 to 330° C., more specifically 220 to 300° C., wherein the die temperature may be different. The extruded thermoplastic composition is quenched in water and pelletized.

Shaped, formed, or molded articles comprising the thermoplastic compositions are also provided. The thermoplastic compositions may be molded into useful shaped articles by a variety of means such as injection molding, extrusion, rotational molding, blow molding and thermoforming. In a specific embodiment, molding is done by injection molding. Desirably, the thermoplastic composition has excellent mold filling capability and is useful to form articles such as, for example, optical media, including holographic storage media, thin-wall parts bottles, tubing, beakers, centrifuge tubes, pipettes, glucose meters, inhalers, syringes, dialysis fittings, sample vials, blood bags, petri dishes, spatulas, connectors, trocars, stopcocks, luer locks, Y-sites, catheters, oxygenator housings, trays, dental instruments, and the like.

Unless specified differently, the flame retardancy of the compositions disclosed herein was determined by UL 94 Flammability Testing standards In this regard, there are generally two types of pre-selection test programs conducted by Underwriters Laboratory (UL) on plastic materials to measure flammability characteristics. The first determines the material's tendency either to extinguish or to spread the flame once the specimen has been ignited. This program is described in UL 94, The Standard for Flammability of Plastic Materials for Parts in Devices and Appliances, which is now harmonized with IEC 60707, 60695-11-10 and 60695-11-20 and ISO 9772 and 9773, which is incorporated fully herein by reference.

The second test program measures the ignition resistance of the plastic to electrical ignition sources. The material's resistance to ignition and surface tracking characteristics is described in UL 746A, which is similar to the test procedures described in IEC 60112, 60695 and 60950.

With respect to UL 94, there are 12 flame classifications specified therein that are assigned to materials based on the results of small-scale flame tests. These classifications, listed below in descending order of flammability, are used to distinguish a material's burning characteristics after test specimens have been exposed to a specified test flame under controlled laboratory conditions.

Six of the classifications relate to materials commonly used in manufacturing enclosures, structural parts and insulators found in consumer electronic products (5VA, 5VB, V-0, V-1, V-2, HB).

Three of the remaining six classifications relate to low-density foam materials commonly used in fabricating speaker grills and sound-deadening material (HF-1, HF-2, HBF).

The last three classifications are assigned to very thin films, generally not capable of supporting themselves in a horizontal position (VTM-0, VTM-1, VTM-2). These are usually assigned to substrates on flexible printed circuit boards.

During testing, specimens molded from the plastic material are oriented in either a horizontal or vertical position, depending on the specifications of the relevant test method, and are subjected to a defined flame ignition source for a specified period of time. In some tests, the test flame is only applied once, as is the case of the horizontal burning (HB) test, while in other tests the flame is applied twice or more.

A HB flame rating indicates that the material was tested in a horizontal position and found to burn at a rate less than a specified maximum. The three vertical ratings, V2, V1 and V0 indicate that the material was tested in a vertical position and self-extinguished within a specified time after the ignition source was removed. The vertical ratings also indicate whether the test specimen dripped flaming particles that ignited a cotton indicator located below the sample. UL 94 also describes a method in which the test flame is applied for up to five applications, in testing for a 5VA or 5VB classification. These small-scale tests measure the propensity of a material to extinguish or spread flames once it becomes ignited.

A more detailed explanation of the parameters for a UL 94 V0 flammability rating utilized herein is set forth below.

The disclosure is further illustrated by the following non-limiting examples.

EXAMPLES

In the following examples, the melt flow rate (MFR) was measured on the extruded pellets, in accordance with ASTM D1238-01. MFR is defined as the weight of a sample that passes though an orifice with a piston when a sample of 6 to 7 grams is placed under a constant load of 1.2 kilograms at 300° C. in 10 minutes, with a dwell time of 6 minutes. Results are expressed in units of grams per 10 minutes (g/10 min).

Notched Izod Impact (abbreviated as "NII") at different temperatures was measured in accordance with ASTM D256-03 using a 5 pound hammer. NII 23° C. was measured with bars aged under room temperature for 24 hours; NII 0° C. was measured with bars aged under 0° C. for 24 hours; NII −10° C. was measured with bars aged under −10° C. for 24 hours; NII −20° C. was measured with bars aged under −20° C. for 24 hours; and NII −30° C. was measured with bars aged under −30° C. for 24 hours.

Notched Izod Impact strength (NII) and percent ductility may also be determined on one-eighth inch (3.2 mm) bars per ASTM D256. Izod Impact Strength ASTM D 256 ('NII') may be used to compare the impact resistances of plastic materials. The results may be reported in J/m.

Gloss Retention is defined as retention of gloss of color chips after 1500 kJ Xenon light exposure in accordance with ASTM G155-1, and gloss was measured according to ASTM D2457 at 60° using Garden Gloss Meter; Total FOT is defined as total flame-out-time of 5 specimens (T1 plus T2) in accordance with the UL 94 test protocol.

Flammability testing was conducted using the statistical "UL Tool" in which 5 bars, at the specified thickness, were burned using the UL94 test protocol and the total flame-out-time was calculated. The table below shows the criteria for V0, V1 and V2 under UL 94 standards.

| Test type | UL 94 V0 | UL 94 V1 | UL 94 V2 |
| --- | --- | --- | --- |
| Each flame out time (t1 or t2) | <=10 s | <=30 s | <=30 s |
| Total afterflame time for 5 specimen (t1 + t2) | <=50 | <=250 | <=250 |
| Afterflame plus afterglow time for each specimen (t2 + t3) | <=30 s | <=60 s | <=60 s |
| Afterflame or afterglow up to the holding clamp | No | No | No |
| Cotton Ignited | No | No | Yes |

The normal loading of MBS in commercialized impact modified polycarbonate is generally about 4 percent. In this trial, 4 percent MBS and 4 percent polysiloxane-polycarbonate copolymer (PC-Si, labeled "EXL" in the tables) were blended into polycarbonate as control samples. As shown in Table 1, control 1 with 4 percent polysiloxane-polycarbonate copolymer is brittle at −30° C. Control 2 with 4 percent MBS is ductile, but compared with the same total loading of MBS/PC-Si mixtures (exp. 1-exp. 4, which had 4 percent impact modifier total), the Notched Izod Impact value is lower in all temperature ranges. Surprisingly, in experiment #5 (exp. 5), the impact modifier loading is reduced to 62 percent of the original loading (with a mixture of only 1.25 percent MBS/ 1.25 percent polysiloxane-polycarbonate copolymer). The sample is not only ductile, but the Notched Izod Impact is 20 percent higher than in control 2 (which has 4 percent MBS) at −30° C. MBS/PC-Si blends have better gloss retention under 1500 kj UV exposure compared to samples having polysiloxane-polycarbonate copolymer only or MBS only as the impact modifier, which means the dual system gives better UV resistant capability.

TABLE 1

MBS/PC-Si mixture in neat polycarbonate

|  |  | control 1 | control 2 | exp. 1 | exp. 2 | exp. 3 | exp. 4 | exp. 5 |
|---|---|---|---|---|---|---|---|---|
|  | BPA-PC 22K | 57.1 | 57.1 | 57.1 | 57.1 | 57.1 | 57.1 | 58 |
|  | BPA-PC 30K | 38 | 38 | 38 | 38 | 38 | 38 | 38.6 |
|  | MBS |  | 4 | 0.5 | 2 | 2.75 | 3.5 | 1.25 |
|  | EXL | 4 |  | 3.5 | 2 | 1.25 | 0.5 | 1.25 |
|  | PETS | 0.3 | 0.3 | 0.3 | 0.3 | 0.3 | 0.3 | 0.3 |
|  | Irgaphos 168 | 0.1 | 0.1 | 0.1 | 0.1 | 0.1 | 0.1 | 0.1 |
|  | Seenox 412S | 0.2 | 0.2 | 0.2 | 0.2 | 0.2 | 0.2 | 0.2 |
|  | Irganox 1076 | 0.3 | 0.3 | 0.3 | 0.3 | 0.3 | 0.3 | 0.3 |
| MFR | g/10 min | 15 | 15.6 | 14.4 | 15 | 15.2 | 15.7 | 14.7 |
| NII 23° C. | J/m | 860 | 731 | 844 | 752 | 757 | 723 | 796 |
| NII 0° C. | J/m | 832 | 682 | 790 | 722 | 720 | 697 | 786 |
| NII –10° C. | J/m | 778 | 685 | 786 | 744 | 733 | 692 | 750 |
| NII –20° C. | J/m | 688 | 643 | 711 | 662 | 838 | 628 | 718 |
| NII –30° C. | J/m | 255 | 602 | 741 | 678 | 664 | 621 | 723 |
| Gloss retention % |  | 66.4 | 57.1 | 74.9 | 68.3 | 68.7 | 74 | 77.1 |

The flame retardant capability of this MBS/PC-Si mixture was also evaluated. From Table 2, it is clear that the formulation with the polysiloxane-polycarbonate only (Exp. 6) exhibits good flame retardant performance with total FOT 22.7 of seconds and passes UL 94 V0 @ 1.6 mm, but the sample is brittle at –20° C. Formulations with MBS only (Exp. 8-Exp. 10) show good low temperature impact ductility, but the total FOT (flame out time) is much longer than in samples with PC-Si only. Additionally, these formulations do not pass the UL 94 V0 @ 1.6 mm test. It is very clear that higher loading of MBS results in worse FR performance. The combination of MBS/PC-Si (Exp. 7) gives an excellent balance of low temperature impact and FR capability. With the same loading of impact modifier, the composition can pass UL 94 V0 @ 1.6 mm and maintain ductility at –20° C.

TABLE 2

MBS/EXL mixture with FR package.

|  | Exp. 6 | Exp. 7 | Exp. 8 | Exp. 9 | Exp 10 |
|---|---|---|---|---|---|
| BPA-PC 22K | 33.4 | 33.4 | 33.4 | 33.4 | 33.4 |
| BPA-PC 30K | 62 | 62 | 62 | 62 | 62 |
| MBS |  | 1.5 | 1.5 | 3 | 4 |
| EXL | 3 | 1.5 |  |  |  |
| KSS | 0.3 | 0.3 | 0.3 | 0.3 | 0.3 |
| PTFE | 0.46 | 0.46 | 0.46 | 0.46 | 0.46 |
| PETS | 0.4 | 0.4 | 0.4 | 0.4 | 0.4 |
| Doverphos S9228 | 0.06 | 0.06 | 0.06 | 0.06 | 0.06 |
| MFR g/10 min | 6.46 | 6.46 | 6.74 | 6.23 | 5.89 |
| NII 23° C. J/m | 917 | 883 | 882 | 847 | 824 |
| NII –10° C. J/m | 821 | 825 | 831 | 823 | 760 |
| NII –20° C. J/m | 389 | 748 | 777 | 747 | 741 |
| UL 94 rating @ 1.6 mm | V0 | V0 | V2 | V2 | V2 |
| Total FOT of 5 bars | 22.7 | 17.8 | 35.8 | 48.2 | 154 |

Accordingly, the use of dual impact modifiers (MBS and PC-Si) in polycarbonate provides excellent low temperature ductility concurrently with improved UV resistance and FR performance.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A thermoplastic composition comprising (i) 100 parts by weight of polycarbonate; (ii) an elastomer-modified graft copolymer; and (iii) a polysiloxane-polycarbonate copolymer, wherein the elastomer-modified graft copolymer and the polysiloxane-polycarbonate copolymer together equal 4 weight percent or less, and the composition has a Notched Izod Impact strength at –30° C. of about 720 J/m or greater when measured according to ASTM D256.

2. The thermoplastic composition according to claim 1, wherein the elastomer-modified graft copolymer comprises methyl methacrylate-butadiene-styrene copolymer (MBS).

3. The thermoplastic composition according to claim 1, wherein the polysiloxane-polycarbonate copolymer comprises repeating siloxane units of formula (S-1):

wherein each occurrence of $R_1$ is same or different, and is a $C_{1-13}$ monovalent organic radical; and D may have an average value of 2 to 1,000.

4. The thermoplastic composition according to claim 1, wherein the polyslioxane-polycarbonate copolymer comprises from about 50 to about 99 weight percent of carbonate units and from about 1 to about 50 weight percent siloxane units.

5. The thermoplastic composition according to claim 1, wherein the polysiloxane-polycarbonate copolymer comprises from about 2 weight percent to about 30 weight percent siloxane units.

6. The thermoplastic composition according to claim 1, wherein the polysiloxane-polycarbonate copolymer comprises about 20 percent siloxane segments by weight.

7. The thermoplastic composition according to claim 1, wherein the amount of siloxane present in the composition is from about 0.06 weight percent to about 1.4 weight percent 8. The thermoplastic composition according to claim 1, wherein the polycarbonate comprises repeating structural carbonate units of the formula (A-1):

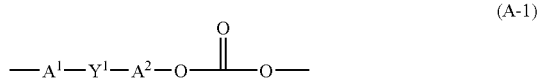

(A-1)

wherein each of $A^1$ and $A^2$ is a monocyclic divalent aryl radical and $Y^1$ is a bridging radical having one or two atoms that separate $A^1$ from $A^2$.

9. The thermoplastic composition according to claim 1, wherein the polycarbonate comprises repeating structural carbonate units of the formula (A-2):

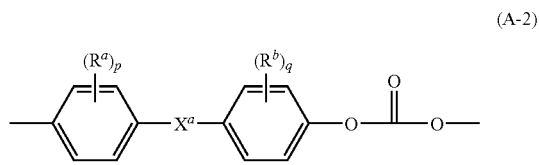

(A-2)

wherein $R^a$ and $R^b$ each represent a halogen atom or a monovalent hydrocarbon group and may be the same or different; p and q are each independently integers of 0 to 4; and $X^a$ represents one of the groups of formula (5):

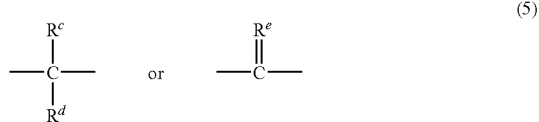

(5)

wherein $R^c$ and $R^d$ each independently represent a hydrogen atom or a monovalent linear or cyclic hydrocarbon group and $R^e$ is a divalent hydrocarbon group.

10. The thermoplastic composition according to claim 1, wherein the polycarbonate comprises repeating structural carbonate units of the formula (A-3):

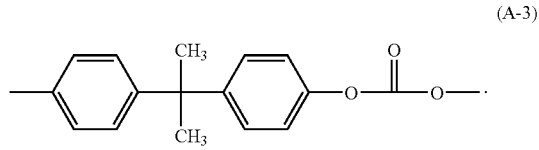

(A-3)

11. The thermoplastic composition according to claim 1, wherein the polycarbonate comprises a mixture of bisphenol A polycarbonates (BPA-PCs) with molecular weight of about 22,000 and 30,000 respectively 12. The thermoplastic composition according to claim 1, further comprising one or more optional additives selected from the group consisting of hydrolysis stabilizer, filler/reinforcing agent, visual effect enhancer, antioxidant, heat stabilizer, light stabilizer, ultraviolet light absorber, plasticizer, mold release agent, lubricant, antistatic agent, pigment, dye, flame retardant, processing aid, radiation stabilizer, anti-drip agent, and combinations thereof.

13. The thermoplastic composition according to claim 12, wherein the flame retardant agent comprises potassium diphenylsulfone sulfonate (KSS).

14. The thermoplastic composition according to claim 1, further comprising polytetrafluoroethylene (PTFE).

15. An article made from the composition according to claim 1,

16. The article according to claim 15, wherein the article is capable of achieving a UL 94 V0 rating at 1.6 mm.

17. A thermoplastic composition comprising (i) 100 parts by weight of polycarbonate; (ii) an elastomer-modified graft copolymer; (iii) a polysiloxane-polycarbonate copolymer; and (iv) from about 0.1 parts to about 10.0 parts by weight of a flame retardant agent, wherein the elastomer-modified graft copolymer and the polysiloxane-polycarbonate copolymer together equal 4 weight percent or less; the weight ratio of the elastomer-modified graft copolymer to the polysiloxane-polycarbonate copolymer is about 1:1; and the composition has a Notched Izod Impact strength at −30° C. of from about 720 J/m to about 740 J/m when measured according to ASTM D256.

18. A thermoplastic composition comprising a polycarbonate, an elastomer-modified graft copolymer, and a polysiloxane-polycarbonate copolymer, wherein the elastomer-modified graft copolymer and the polysiloxane-polycarbonate copolymer together equal about 2.5 weight percent or less, and wherein an article made from the composition can achieve a UL 94 V0 rating at 1.6 mm while maintaining a Notched Izod Impact strength according to ASTM D256 at −30° C. of about 720 J/m.

19. An article formed from a composition comprising (i) 100 parts by weight of a polycarbonate; (ii) an elastomer-modified graft copolymer; and (iii) a polysiloxane-polycarbonate copolymer, wherein the elastomer-modified graft copolymer and the polysiloxane-polycarbonate copolymer together equal about 2.5 weight percent; and wherein the article exhibits a Notched Izod Impact according to ASTM D256 at −30° C. of about 720 J/m and gloss retention under 1500 kJ UV exposure of 77 or more.

20. An article formed from a thermoplastic composition comprising (i) 100 parts by weight of a bisphenol-A polycarbonate; (ii) a (meth)acrylate-butadiene-styrene copolymer; and (iii) a polysiloxane-polycarbonate copolymer; wherein the (meth)acrylate-butadiene-styrene copolymer and the polysiloxane-polycarbonate copolymer together equal about 2.5 weight percent or less; and wherein the molded article exhibits a Notched Izod Impact according to ASTM D256 at −30° C. of about 720 J/m and achieves a UL94 V0 rating at 1.6 mm.

* * * * *